(12) United States Patent
Shima

(10) Patent No.: US 6,552,816 B1
(45) Date of Patent: Apr. 22, 2003

(54) PRINTING SYSTEM AND PRINTER

(75) Inventor: Toshihiro Shima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/357,147

(22) Filed: Jul. 19, 1999

(30) Foreign Application Priority Data

Jul. 21, 1998 (JP) .......................................... 10-204954

(51) Int. Cl.$^7$ .............................................. G06K 15/00
(52) U.S. Cl. ................................................ 358/1.15
(58) Field of Search ................................ 358/1.1, 1.15, 358/1.16, 1.13, 1.6, 1.9, 1.11, 539, 404, 444, 403, 402, 401, 470; 710/8, 10, 14, 16, 15, 62, 72

(56) References Cited

U.S. PATENT DOCUMENTS 5,220,431 A * 6/1993 Yamagguchi ............... 358/296
5,276,802 A * 1/1994 Yamaguchi et al. ........ 385/115

FOREIGN PATENT DOCUMENTS

| EP | 0 820 032 A2 | 1/1998 |
| EP | 0 847 002 A1 | 6/1998 |

* cited by examiner

Primary Examiner—Arthur G. Evans
(74) Attorney, Agent, or Firm—Sughrue Mion, PLLC

(57) ABSTRACT

A printer receives job location data showing the location of the job data of each print job and simultaneously sends a request for acquiring attribute data such as a header related to the job data to host computers which the job location data shows. The printer analyzes attribute data sent earliest, demands job data related to the attribute data from the host computer which sends the attribute data and processes the print job. Another printer provided with plural output bins receives job data for the number of the output bins, allocates the job data to each output bin, processes the print jobs of the job data in parallel and outputs the printed result generated by the processing to the allocated output bin in the generated order.

21 Claims, 6 Drawing Sheets

PRINTING SYSTEM AND PRINTER

BACKGROUND OF THE INVENTION

1. Field of the Invention

The present invention relates to an improvement of a network printing system in which a printer receives a print job from a host computer on a network and prints.

The present application is based on Japanese Patent Application No. Hei. 10-204954, which is incorporated herein by reference.

2. Description of the Related Art

In a conventional type network printing system, a print job is unilaterally sent to a printer from a host computer or a print server, the printer passively receives it and sequentially processes it.

A printer always only passively prints when it receives a print job from a host computer or a print server and cannot spontaneously print. As a printer does not start another job until one job is finished when the printer starts the one job, the termination of the whole printout is delayed when a job the transfer rate in a network of which is slow is once started.

SUMMARY OF THE INVENTION

Therefore, the object of the present invention is to enable the efficient processing of print jobs from a host computers.

Another object of the present invention is to enable a printer to make a request to a host computer for a print job and spontaneously print.

Further another object of the present invention is to enable a printer to receive plural print jobs and simultaneously process each job.

A printing system according to the present invention is provided with one or plural host computers for generating the job data of a print job and a printer for receiving job data from the one or plural host computers and printing, and the printer is provided with a job request section for making a request to one or plural host computers for job data and a printing section for receiving job data sent from the one or plural host computers in response to the request from the job request section and printing. Hereby, the printer can judge which job is given priority and efficiently process print jobs from plural host computers.

In embodiments of the present invention, each host computer informs a print server of the location of job data when a print job is generated, the print server temporarily stores the informed location of job data and informs a printer of the location. Or each host computer directly sends the location data of a job to a printer. A printer makes a request to all host computers which the received location data of jobs shows for attribute data related to job data such as the capacity of job data so as to execute the jobs. The printer demands job data related to attribute data sent earliest in response to the request from the host computer having the job data.

In a preferred embodiment, a printer is provided with plural output bins, receives job data of the number up to the number of output bins, allocates the above job data to each output bin, executes plural job processing in parallel and outputs the result of printing generated in the job processing every print job to the allocated output bin. Hereby, as the following job can be efficiently printed in parallel with another job even if a job the transfer rate in a network of which is slow is included in print jobs, time required for the whole printout can be greatly reduced.

A computer can typically function as a print server and a host and a computer program for the function can be installed or loaded in a computer via various media such as a disk storage, a semiconductor memory and a communication network.

Features and advantages of the invention will be evident from the following detailed description of the preferred embodiments described in conjunction with the attached drawings.

DETAILED DESCRIPTION OF THE PREFERRED EMBODIMENTS

Figure 1:
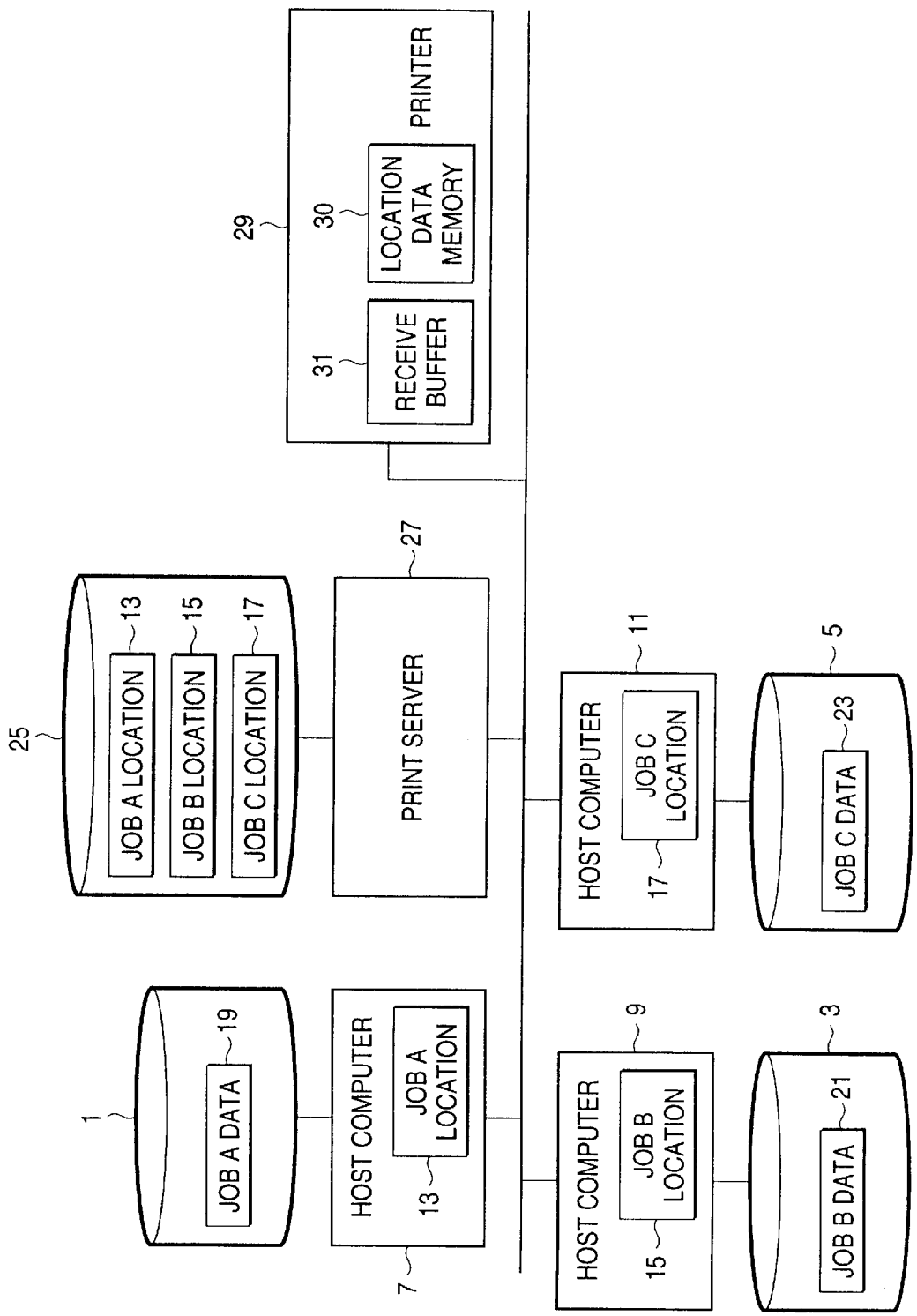
FIG. 1 is a block diagram showing the whole configuration in an embodiment of the present invention.

FIG. 1 shows the whole configuration in an embodiment of the present invention.

A printer 29, a print server 27 and some host computers 7, 9 and 11 are connected to a communication network such as LAN (however, the print server 27 is not necessarily connected).

Each host computer 7, 9, 11 is provided with each auxiliary storage 1, 3, 5 such as a fixed disk. A printer driver is provided inside each host computer 7, 9, 11. Each printer driver generates print job data 19, 21, 23 when the printer driver receives an instruction to print from a user and instructs each auxiliary storage 1, 3, 5 to store the job data 19, 21, 23. The printer driver in each host computer 7, 9, 11 sends data 13, 15, 17 showing the location of the job data 19, 21, 23 such as the address in a network of each host computer 7, 9, 11, the local directory in each host computer 7, 9, 11 of the job data 19, 21, 23 and a set of the job data and its identifier to the print server 27. The printer driver of each host computer 7, 9, 11 also reads the job data 19, 21, 23 from the auxiliary storage 1, 3, 5 of each host computer 7, 9, 11 when the printer driver receives a job request described later from the printer 29 and sends the job data to the printer 29. Or the printer driver of each host computer 7, 9, 11 sends only job location data such as an address in a network and a local job name to the print server 27 without generating job data on the spot when a print job is generated, afterward, generates job data and sends it to the printer 29 when the printer driver receives a job request from the printer 29.

The print server 27 is provided with an auxiliary storage 25 such as a fixed disk, receives the job location data 13, 15, 17 from each host computer 7, 9, 11, temporarily stores and queues it in the auxiliary storage 25 and sends the job location data 13, 15, 17 to the printer 29.

The printer 29 is provided with a receive buffer memory 31 for temporarily storing print job data and a job location data memory 30 for storing the job location data 13, 15, 17.

The printer 29 stores the job location data 13, 15, 17 sent from the print server 27 in the job location data memory 30. Afterward, in executing a print job, the printer 29 lists the stored job location data 13, 15, 17 and simultaneosly requests all host computers 7, 9 and 11 which the job location data 13, 15, 17 shows to send the attribute data such as data showing the capacity and the data type of a print job, typically the header of print job data of the job data 19, 21, 23. The printer 29 requests only the host computer which sends the following attribute data to send print job data when the printer receives attribute data sent earliest out of the requested attribute data and does not request print job data from the other host computers. The printer 29 temporarily stores print job data sent from the host computer in response to the request in the receive buffer memory 31, reads the print job data from the receive buffer memory 31 and executes printing processing.

Figure 2:
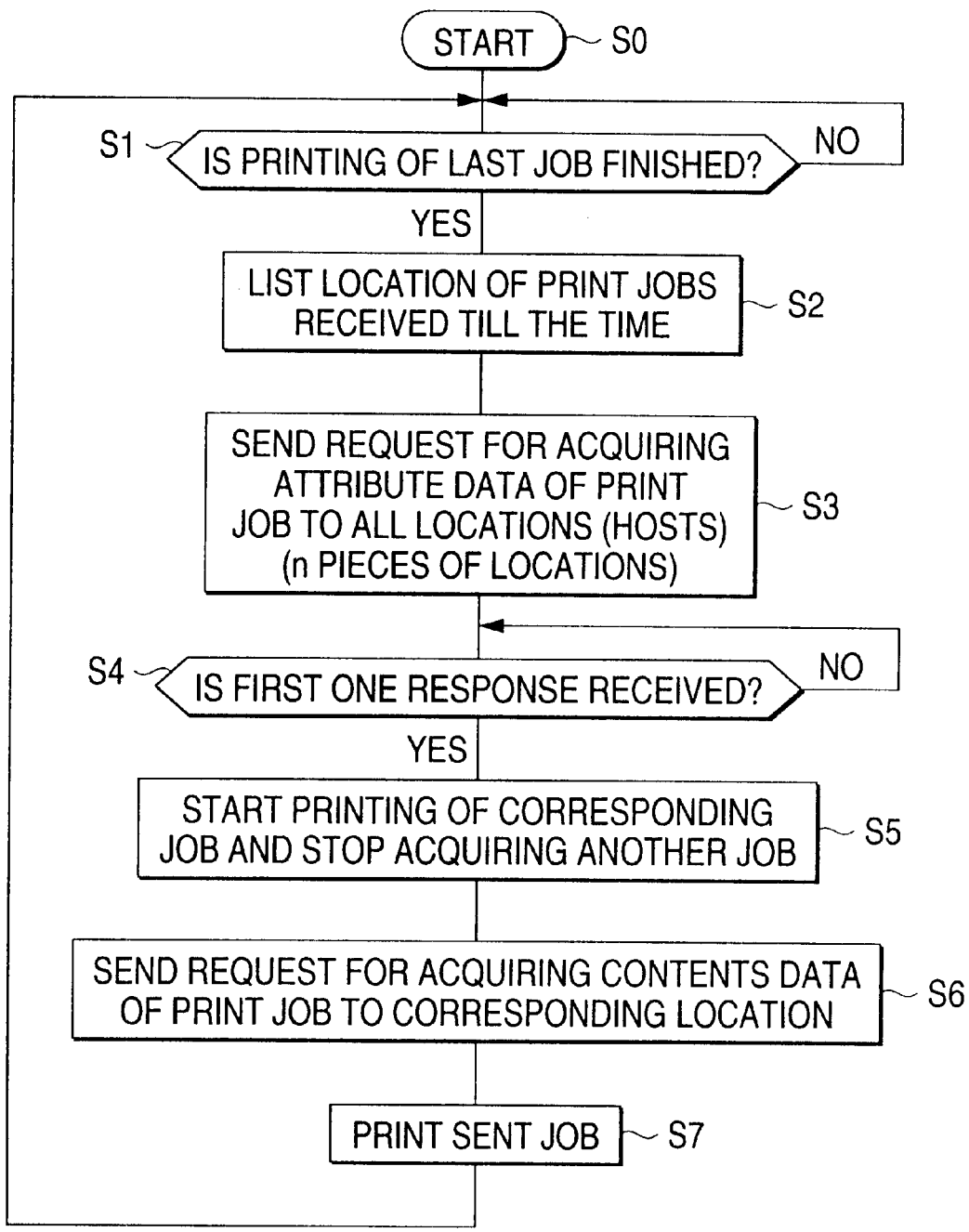
FIG. 2 is a flowchart showing the operation of a printer 29.

FIG. 2 shows the operation of the printer 29.

The printer 29 lists job location data received till the time in S2 unless there is a processed print job (Yes in S1) and requests all n pieces of listed job locations (host computers) to send attribute data related a print job in S3. When the printer acquires any of the requested attribute data (Yes in S4), it starts the processing process of a job having the attribute data acquired earliest and stops acquiring the attribute data of another job in S5. The printer issues a request for acquiring the contents of the job to the host computer which sends the acquired attribute data in S6. When the printer receives the requested job contents data, it analyzes the job contents data, generates a print image and passes it to its own print engine to print in S7.

Figure 3:
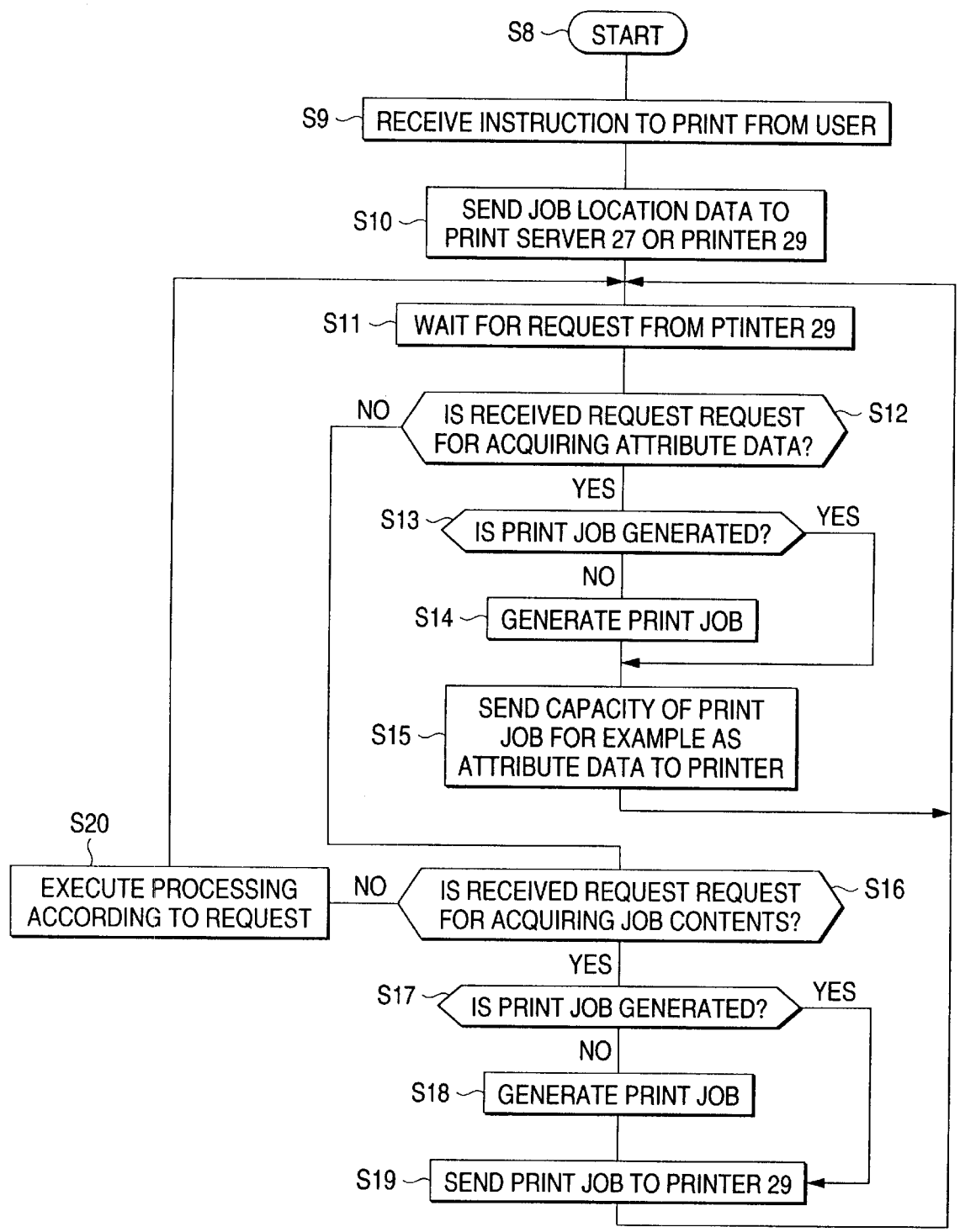
FIG. 3 is a flowchart showing the operation of the printer driver of each host computer 7, 9, 11.

FIG. 3 shows the operation of the printer driver of each host computer 7, 9, 11.

Each host computer 7, 9, 11 generates print job data (or leaves the generation of the data until later) when it receives an instruction to print from a user in S9, sends print job location data to the print server 27 or the printer 29 in S10 and afterward, waits for a request from the printer 29 in S11. When each host computer receives a request for acquiring attribute data from the printer 29 (Yes in S12), it sends the attribute data (as described above, data showing the capacity and others of a job such as the header of job data) of a print job to the printer 29 in S15. If job data is generated (Yes in S13) after each host computer receives a request for acquiring attribute data from the printer 29, it sends the attribute data to the printer 29 in S15 after it generates print job data in S14. Afterward, when each host computer receives a request for acquiring job contents from the printer 29 (Yes in S16), it sends print job data to the printer 29 in S19. If each host computer generates job data (No in S17) after it receives a request for acquiring job contents from the printer 29 as described above, it sends print job data to the printer 29 after it generates the print job data in S18.

According to the above embodiment, as the printer 29 makes a job request to all host computers which generate a print job and sequentially processes jobs in order from a job acquired earliest, it can efficiently process jobs from plural host computers. Also, as the printer 29 demands only the attribute data such as a header of job data in a first job request and processes jobs in order from a job the attribute data of which is received earliest, it can judge which job should be processed earlier based upon only attribute data having only small data. As the print server 27 has only to store only the location of job data, capacity required for the auxiliary storage is greatly reduced. The printer 29 can request a host computer to send not the whole job data but only a specified part when the printer issues a request for acquiring job contents and in addition, can issue a request for acquiring each part at desired time (for example, the printer demands only odd pages at first and demands even pages after processing is finished). Hereby, the printer 29 can adjust the quantity of received job data according to the situation of its own print engine, the securable capacity of the job receive buffer memory and others and as a result, can reduce required memory capacity.

If each host computer 7, 9, 11 does not generate job data until it receives a request from the printer without generating job data soon when a job occurs, waste that job data is stored in a storage for a long time can be avoided.

Figure 4:
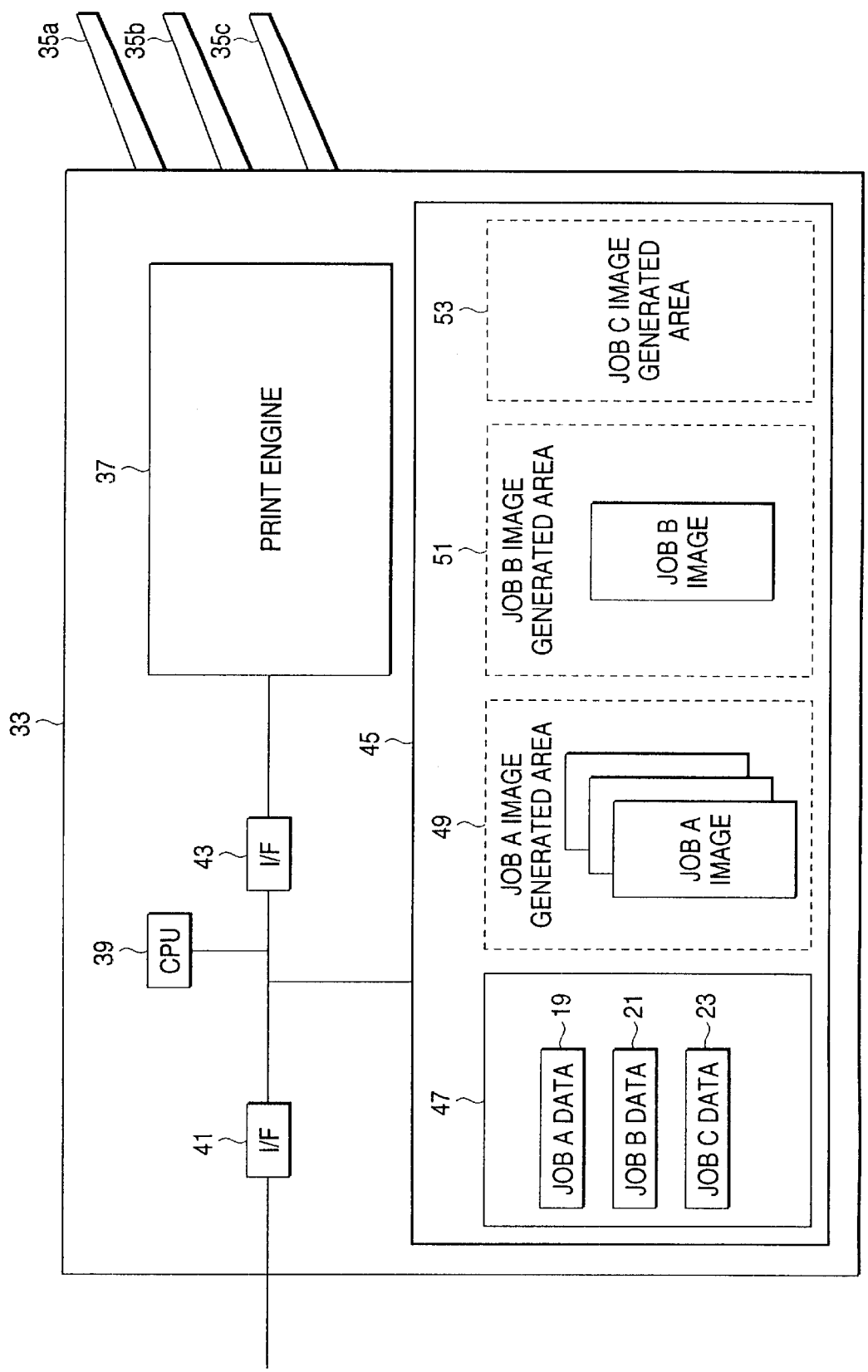
FIG. 4 is a block diagram showing the configuration of a network printer 33 according to a second embodiment of the present invention.

FIG. 4 shows the configuration of a network printer 33 equivalent to a second embodiment of the present invention.

This printer 33 is provided with CPU 39 which can execute the job processing processes of acquired plural job data 19, 21, 23 in parallel, interfaces 41, 43, plural output bins 35a, 35b and 35c, a print engine 37 for distributing paper to a predetermined output bin and a memory 45 used for a receive buffer, a print buffer and others. In the memory 45, a receive buffer 47 for storing acquired job data 19, 21, 23, print buffers 49, 51 and 53 for storing a print image generated by CPU 39 based upon the job data 19, 21, 23 and others are secured. CPU 39 can process print jobs of the number equal to the number of provided output bins in parallel. Each output bin is allocated to each job processed in parallel. For example, the printed result of the job data 19 is output to the output bin 35a, the printed result of the job data 21 is output to the output bin 35b and the printed result of the job data 23 is output to the output bin 35c.

Figure 5:
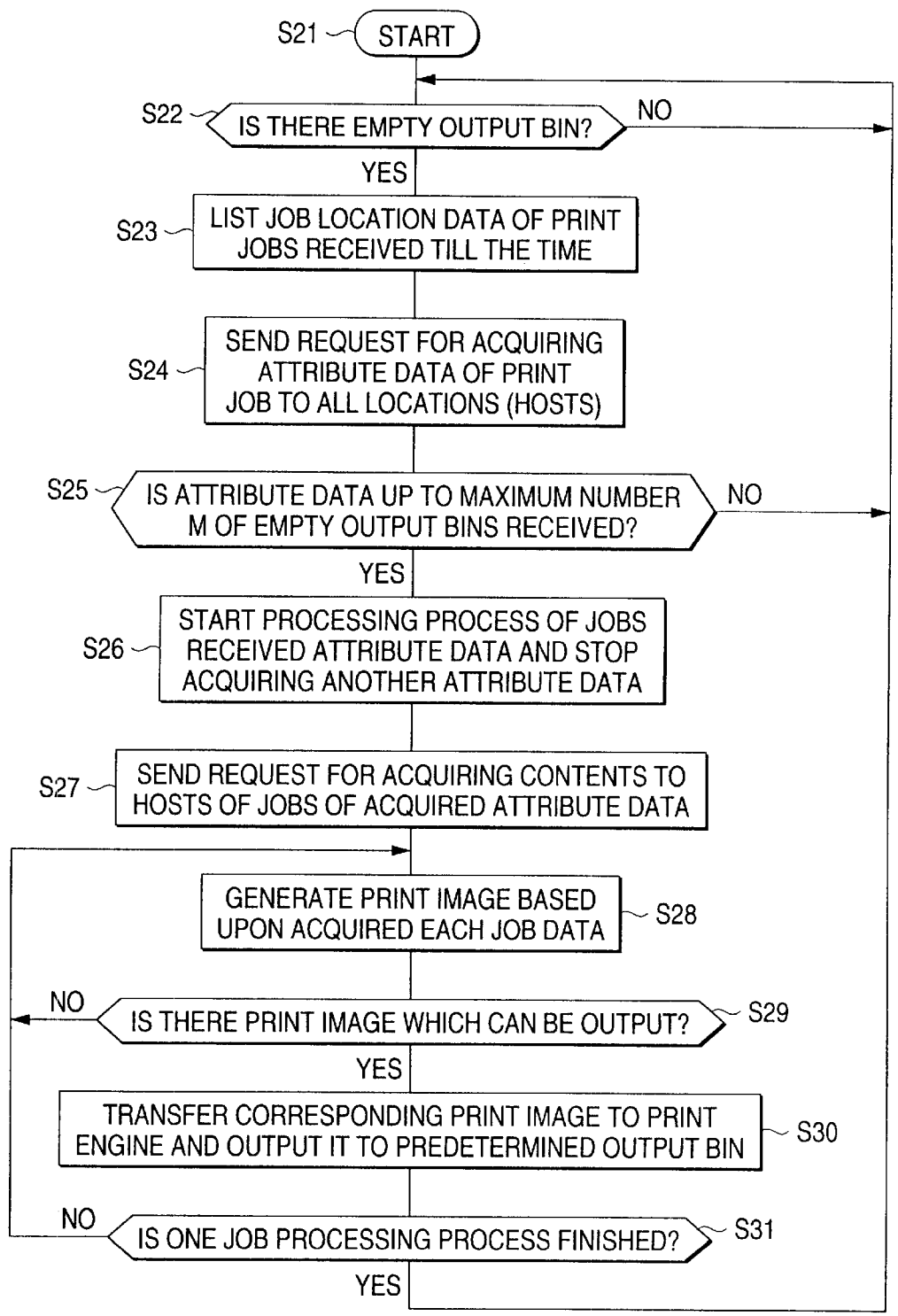
FIG. 5 is a flowchart showing the operation of the network printer 33.

FIG. 5 shows the operation of CPU 39 in the printer 33.

When the last job processing is finished and the used output bin becomes empty (Yes in S22), the printer 33 first lists the location data (the host data) of print jobs received till the time in S23. The printer simultaneously sends a request for acquiring attribute data to all the listed n pieces of job locations (hosts). When the printer acquires attribute data of the number within the total number m of empty output bins (Yes in S25), it starts each job processing, allocates the empty output bin to each job and stops acquiring another job in S26 when there is no empty output bin. Next, the printer sends a request for acquiring job contents data to the host computer of a job related to the acquired attribute data in S27. When the printer acquires each job data, it generates the print image of each job in parallel in S28. The printer transfers the completed print image to the print engine 37 in order in which the print image is completed (Yes in S29) and outputs it to a predetermined output bin. When any job processing process is finished in S31, the operation in S22 to S30 is repeated.

As for the operation in steps S28 to S30, CPU 39 generates each print image in parallel in case it receives three job data 19, 21, 23 for example. CPU 39 sends the print image to the print engine 37 in generated order and instructs the print engine to output the print image to a predetermined output bin. If CPU 39 first generates a print image for three pages of the job data 19 first acquired, it first sends the print image to the print engine 37. If CPU generates a print image for one page of the job data 21 afterward, it next sends the print image to the print engine 37. The printed result of the thee pages of the first job data 19 is output to the output bin 35a and the one page of the next job data 21 is output to the output bin 35b. Three job data 19, 21, 23 is processed in parallel and images are sequentially printed in order in which they are completed earlier such as afterward, as the fourth page of the first job data 19 for example is completed, it is printed and output to the output bin 35a, next, as the second page of the second job data 21 is completed, the printed result is output to the output bin 35b and next, as the first page of the third job data 23 is completed, it is printed and output to the output bin 35c. As described above, plural jobs are efficiently processed in parallel.

According to the above embodiment, the printer 33 executes plural job processing processes in parallel and prints the contents of plural jobs in parallel. Hereby, as the following job can be efficiently printed in parallel with another job even if a job the transfer rate in a network of which is slow is included in print jobs, time required for the whole printout can be greatly reduced.

In the above embodiments, each printer 29, 33 starts printing processing in the order of job data received earliest, however, operation that printing is started from a job the whole job data of which is received earliest is also conceivable.

Figure 6:
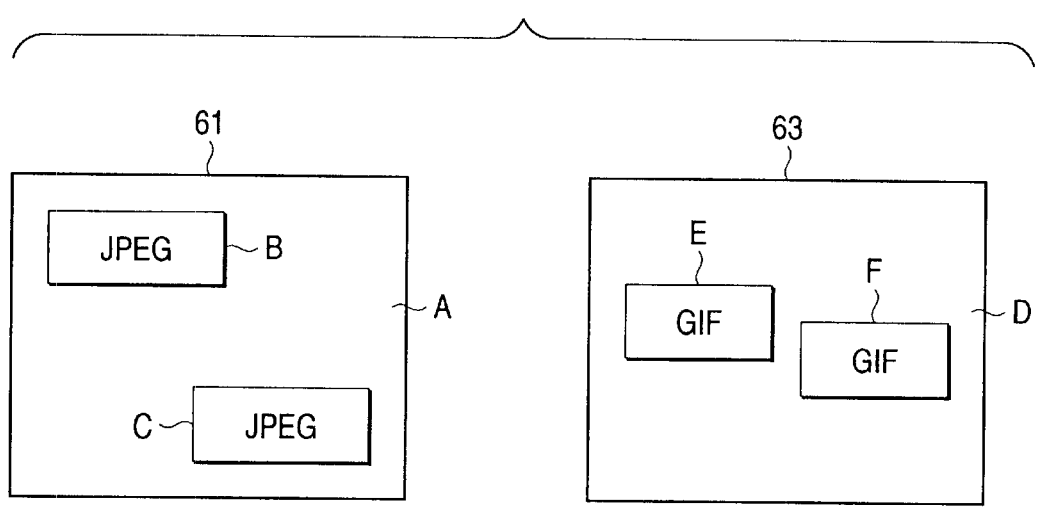
FIG. 6 shows an example of pages printed by the printer.

For example, in case a page written in hyper text markup language (HTML) is received from a web server and others in a network for example and printed, the page is normally composed of an HTML file, an image file according to Joint photographic coding experts group (JPEG) and Graphics Interchange Format (GIF) linked to the HTML file and others. FIG. 6 shows an example. As shown in FIG. 6, a page 61 is composed of an HTML file A and JPEG files B and C linked to the HTML file and a page 63 is composed of an HTML file D and GIF files E and F linked to the HTML file. If a job for printing these two pages occurs, the printer simultaneously requests the uniform resource locator (URL) of web servers having respective pages to send the respective pages 61 and 63. Each server which receives the request sends an HTML file composing each page and each image file linked to the HTML file to the printer. If the printer receives respective files composing each page 61, 63 in the order of A, B, D, E, F and C for example (order in which respective files are received is different depending upon the state of a network at that time), the printing of the page 63 is started because three files D, E and F of the page 63 first gather. After the printing of the page 63 is finished, the page 61 the three files A, B and C of which gather later is printed.

The embodiments of the present invention are described above, however, these embodiments are examples for explaining the present invention and the present invention is not limited to only these embodiments. Therefore, the present invention can be also embodied in various embodiments other than the above embodiments.

What is claimed is:

1. A printing system comprising:
at least one host computer for generating job data of a print job; and
a printer for receiving said job data from said host computer and printing it, said printer comprising:
a job request section for making a job request to said host computer for said job data; and
a printing section for receiving said job data sent from said host computer in response to the job request from said job request section and printing it,
wherein said printing section processes and prints from job data received earliest.

2. A printing system according to claim 1,
wherein said host computer generates job location data showing a location of said job data when the print job is generated,
said printer has a print server for receiving and temporarily storing said job location data from said host computer; and said job request section makes the job request to said host computer which said job location data stored in said print server shows for said job data.

3. A printing system according to claim 1,
wherein said printer has plural output bins, and said printing section receives job data of a number up to a number of said output bins out of said job data sent from said host computer in response to the job request from said job request section, allocates said plural output bins to said received job data, executes plural printing processing in parallel, and outputs a result of printing generated in said printing processing every said job data to said allocated output bin.

4. A printing system comprising:
at least one host computer for generating job data of a print job; and
a printer for receiving said job data from said host computer and printing it, said printer comprising:
a job request section for making a job request to said host computer for said job data; and
a printing section for receiving said job data sent from said host computer in response to the request from said job request section and printing it,
wherein said job request section makes a request for attribute data related to said job data, receives said attribute data sent from said host computer in response to the request for said attribute data from said job request section, selects a print job to be processed based upon said received attribute data and makes the job request for said job data of said selected print job from the host computer having said job data, and
wherein said job request section selects a print job related to attribute data received earliest in response to the request for the attribute data as a print job to be processed.

5. A printing system according to claim 4,
wherein said host computer generates job location data showing a location of said job data when the print job is generated,
said printer has a print server for receiving and temporarily storing said job location data from said host computer; and
said job request section makes the job request to said host computer which said job location data stored in said print server shows for said job data.

6. A printer comprising:
a job request section for making a job request to a host computer having job data of a print job for said job data; and
a printing section for receiving said job data sent in response to the job request from said job request section and printing it,
wherein said printing section processes and prints from job data received earliest.

7. A printer according to claim 6, further comprising a print server for receiving and temporarily storing job location data showing a location of said job data generated by said host computer from said host computer,
wherein said job request section makes the job request to said host computer which said job location data stored in said print server shows for said job data.

8. A printer according to claim 7, further comprising plural output bins,
wherein said printing section receives job data of a number up to a number of said output bins out of said job data sent from said host computer in response to the job request from said job request section, allocates said plural output bins to said received job data, executes plural printing processing in parallel, and outputs a result of printing generated in said printing processing every said job data to said allocated output bin.

9. A printer comprising:

a job request section for making a job request to a host computer having job data of a print job for said job data; and a printing section for receiving said job data sent in response to the job request from said job request section and printing it, wherein said job request section makes a request for attribute data related to said job data, receives said attribute data sent from said host computer in response to the request for the attribute data from said job request section, selects a print job to be processed based upon said received attribute data and makes the job request for said job data of said selected print job from the host computer having said job data, and wherein said job request section selects the print job related to attribute data received earliest in response to the request for the attribute data as a print job to be processed.

10. A method of operating a printer, comprising steps of:

making a job request for job data from a host computer having the job data of a print job;

receiving said job data sent from the host computer; and earliest printing job data received earliest.

11. A method of operating a printer according to claim 10, wherein said printer has plural output bins, and said step of printing comprising steps of:

receiving job data of a number up to a number of said output bins out of said job data sent from said host computer in response to the job request;

allocating said plural output bins to said received job data;

executing plural printing processing in parallel; and outputting a result of printing generated in said printing processing every said job data to said allocated output bin.

12. A method of operating a printer, comprising steps of:

making a request for attribute data related to job data from a host computer;

receiving said attribute data sent from said host computer;

selecting a print job related to said attribute data received earliest as a print job to be processed;

making a job request for job data of said selected print job from said host computer having said job data;

receiving said job data sent from said host computer; and earliest printing job data received earliest.

13. A host computer comprising:

a storage for storing job data of a print job; and a transmitter for sending attribute data related to said stored job data to a printer in response to a request for attribute data related to said job data from said printer and sending said job data to said printer in response to a job request for job data related to said sent attribute data from said printer.

14. A host computer according to claim 13, further comprising a location information section for generating job location data showing a location of said job data and sending it to one of said printer and a print server.

15. A method of operating a host computer, comprising steps of:

storing job data of a print job;

sending attribute data related to said stored job data to a printer in response to a request for attribute data related to said job data from said printer; and sending said job data to said printer in response to a job request for job data related to said sent attribute data from said printer.

16. A method of operating a host computer according to claim 15, further comprising a step of sending job location data showing a location of said job data to one of said printer and a print server.

17. A record medium readable by a computer on which a program for instructing a computer to execute the following steps is recorded, said steps comprising steps of:

making a request for attribute data related to job data from a host computer having the job data of a print job;

receiving said attribute data sent in response to the request;

selecting a print job to be processed based upon attribute data received earliest; and making a job request for job data of said selected print job.

18. A record medium readable by a computer according to claim 17, further recording a step for receiving job location data showing a location of said job data from one of said host computer and a print server, and in said step for making the request, said attribute data is requested from a host computer shown by said job location data.

19. A record medium readable by a computer on which a program for instructing a computer to execute the following steps is recorded, said steps comprising steps of:

receiving job data of a print job generated by a host computer up to a number of output bins provided to a printer;

allocating said output bin to said received job data;

executing plural printing processing in parallel; and outputting a result of printing generated in said printing processing every said job data to said allocated output bin.

20. A record medium readable by a computer on which a program for instructing a computer to execute the following steps is recorded, said steps comprising steps of:

storing job data of a print job;

sending attribute data related to said stored job data to a printer in response to a request for attribute data related to said job data from a printer; and sending said job data to said printer in response to a job request from said printer for job data related to attribute data received earliest by said printer.

21. A record medium readable by a computer according to claim 20, further recording a step of sending job location data showing the location of said job data to a printer or a print server is further recorded.

* * * * *